(12) United States Patent
Bang (10) Patent No.: US 10,515,634 B2
(45) Date of Patent: Dec. 24, 2019

(54) METHOD AND APPARATUS FOR SEARCHING FOR GEOGRAPHIC INFORMATION USING INTERACTIVE VOICE RECOGNITION

(71) Applicants: HYUNDAI MOTOR COMPANY, Seoul (KR); KIA MOTORS CORPORATION, Seoul (KR)

(72) Inventor: Kyu Seop Bang, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 41 days.

(21) Appl. No.: 15/835,278

(22) Filed: Dec. 7, 2017

(65) Prior Publication Data

US 2018/0358014 A1 Dec. 13, 2018

(30) Foreign Application Priority Data

Jun. 7, 2017 (KR) .......................... 10-2017-0070723

(51) Int. Cl.
*G10L 15/22* (2006.01)
*G10L 15/05* (2013.01)
(Continued)

(52) U.S. Cl.
CPC .......... *G10L 15/22* (2013.01); *G01C 21/3679* (2013.01); *G06F 3/167* (2013.01);
(Continued)

(58) Field of Classification Search
CPC ....... G10L 15/22; G10L 15/265; G06F 17/30; G01C 21/3608
See application file for complete search history.

(56) References Cited

U.S. PATENT DOCUMENTS

| | | | |
|---|---|---|---|
| 8,521,539 B1 * | 8/2013 | Teng .................. | G01C 21/3608 701/418 |
| 2002/0039107 A1 * | 4/2002 | Ide ....................... | G06F 17/246 345/619 |

(Continued)

FOREIGN PATENT DOCUMENTS

| KR | 10-0847376 B1 | 7/2008 |
|---|---|---|
| KR | 10-1143968 B1 | 5/2012 |
| KR | 10-1577402 B1 | 12/2015 |

*Primary Examiner* — Paras D Shah
(74) *Attorney, Agent, or Firm* — Knobbe Martens Olson & Bear LLP (57) ABSTRACT

An apparatus for searching for geographic information using interactive voice recognition includes: a receiver configured to receive a voice signal; a voice recognition unit configured to recognize the voice signal; a result analysis processing unit configured to search for geographic information on the basis of the recognized voice signal, and analyze a search result of the geographic information; and a question generating unit configured to generate a question in response to the result of determination. A method for searching for geographic information using interactive voice recognition includes: receiving a voice signal, and recognizing the voice signal; searching for geographic information on the basis of the recognized voice signal; analyzing a search result of the geographic information; and generating a question in response to the result of determination.

15 Claims, 5 Drawing Sheets

(51) Int. Cl.
  *G06F 3/16* (2006.01)
  *G01C 21/36* (2006.01)
  *G10L 15/14* (2006.01)
  *G10L 15/02* (2006.01)
  *G10L 15/12* (2006.01)
  *G10L 15/16* (2006.01)
  *G06F 16/29* (2019.01)
  *G06F 16/248* (2019.01)
  *G10L 13/027* (2013.01)

(52) U.S. Cl.
  CPC ............ *G06F 16/248* (2019.01); *G06F 16/29* (2019.01); *G10L 13/027* (2013.01); *G10L 15/05* (2013.01); *G01C 21/3608* (2013.01); *G10L 15/02* (2013.01); *G10L 15/12* (2013.01); *G10L 15/142* (2013.01); *G10L 15/16* (2013.01); *G10L 2015/223* (2013.01)

(56) References Cited

U.S. PATENT DOCUMENTS

| | | | |
|---|---|---|---|
| 2007/0106643 A1* | 5/2007 | Croft | G06F 16/24556 |
| 2010/0004004 A1* | 1/2010 | Browne-Swinburne | H04W 4/02 455/457 |
| 2011/0191330 A1* | 8/2011 | Barve | G06F 17/30 707/723 |
| 2012/0134590 A1* | 5/2012 | Petrou | G06F 17/30253 382/182 |
| 2013/0304372 A1* | 11/2013 | Mellert | G01C 21/3679 701/410 |
| 2014/0365215 A1* | 12/2014 | Kim | G10L 15/22 704/235 |
| 2015/0088860 A1* | 3/2015 | Hamby | G06F 17/30241 707/722 |
| 2015/0186474 A1* | 7/2015 | Angel | G06F 17/3097 707/723 |
| 2015/0362988 A1* | 12/2015 | Yamamoto | G06F 3/011 345/156 |
| 2016/0092519 A1* | 3/2016 | Srivastava | G06F 17/30554 707/722 |
| 2016/0098410 A1* | 4/2016 | Ziezold | G06F 17/30666 707/724 |
| 2016/0146625 A1 | 5/2016 | Bourque et al. | |
| 2016/0224621 A1* | 8/2016 | Bousquet | G06F 17/30867 |
| 2018/0232376 A1* | 8/2018 | Zhu | G06F 17/279 |
| 2018/0253486 A1* | 9/2018 | Crouse | G06F 17/2211 |

* cited by examiner

| ORDER | NAME OF REPRESENTATIVE POI | LOCATION | | | NAME OF STORE | PERIPHERAL PRINCIPAL POI | ... |
|---|---|---|---|---|---|---|---|
| | | CITY/DO | GU | DONG | | | |
| 1 | STARBUCKS YANGJE STORE | SEOUL CITY | SEOCHO-GU | YANGJE -DONG | YANGJE STORE | YANGJE SEOCHO | ... |
| 2 | STARBUCKS HIBRAND STORE | SEOUL CITY | SEOCHO-GU | YANGJE -DONG | HIBRAND STORE | HIBRAND LG ELECTRONICS SEOCHO R&D CAMPUS | ... |
| 3 | STARBUCKS KYUNGHEE UNIVERSITY STORE | SUWON CITY | YOUNGTONG -GU | YOUNGTONG -DONG | KYUNGHEE UNIVERSITY STORE | KYUNGHEE UNIVERSITY | ... |

FIG. 4B

| ORDER | NAME OF REPRESENTATIVE POI | LOCATION | | | NAME OF STORE | PERIPHERAL PRINCIPAL POI | ... |
|---|---|---|---|---|---|---|---|
| | | CITY/DO | GU | DONG | | | |
| 1 | STARBUCKS YANGJE STORE | SEOUL CITY | SEOCHO-GU | YANGJE -DONG | YANGJE STORE | YANGJE SEOCHO | ... |
| 2 | STARBUCKS HIBRAND STORE | | | | HIBRAND STORE | HIBRAND LG ELECTRONICS SEOCHO R&D CAMPUS | ... |
| 3 | STARBUCKS KYUNGHEE UNIVERSITY STORE | SUWON CITY | YOUNGTONG -GU | YOUNGTONG -DONG | KYUNGHEE UNIVERSITY STORE | KYUNGHEE UNIVERSITY | ... |

| ORDER | NAME OF REPRESENTATIVE POI | LOCATION | | | NAME OF STORE | PERIPHERAL PRINCIPAL POI | ... |
|---|---|---|---|---|---|---|---|
| | | CITY/DO | GU | DONG | | | |
| 1 | STARBUCKS YANGJE STORE | SEOUL CITY | SEOCHO-GU | YANGJE -DONG | YANGJE STORE | YANGJE SEOCHO | ... |
| 2 | STARBUCKS HIBRAND STORE | | | | HIBRAND STORE | HIBRAND LG ELECTRONICS SEOCHO R&D CAMPUS | ... |
| 3 | STARBUCKS KYUNGHEE UNIVERSITY STORE | SUWON CITY | YOUNGTONG -GU | YOUNGTONG -DONG | KYUNGHEE UNIVERSITY STORE | KYUNGHEE UNIVERSITY | ... |
| count | 3 | 2 | 2 | 2 | 3 | 3 | |

610

METHOD AND APPARATUS FOR SEARCHING FOR GEOGRAPHIC INFORMATION USING INTERACTIVE VOICE RECOGNITION

CROSS REFERENCE TO RELATED APPLICATION

This application claims the benefit of Korean Patent Application No. 10-2017-0070723, filed on Jun. 7, 2017, which is hereby incorporated by reference as if fully set forth herein.

BACKGROUND

Field

The present disclosure relates to a method and apparatus for searching for geographic information using interactive voice recognition, and more particularly to an apparatus for attaching a tag for detailed information to each point-of-interest (POI) of geographic information when searching for geographic information, analyzing the recognition result on the basis of the attached tag, and reducing the number of geographic information search results by asking a user about the analyzed result, thereby preventing user distraction.

Discussion of the Related Art

Figure 1:
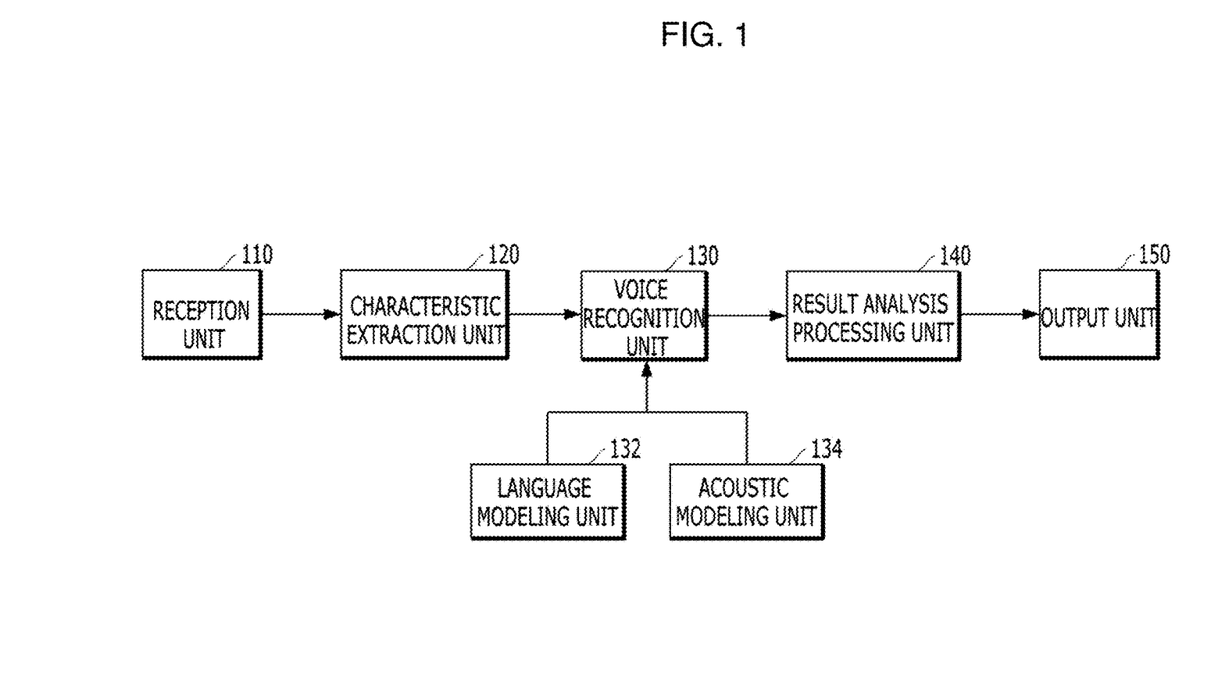
FIG. 1 is a block diagram illustrating a typical voice recognition apparatus.

FIG. 1 is a block diagram illustrating a typical voice recognition apparatus.

Referring to FIG. 1, the voice recognition apparatus may include a reception unit 110, a characteristic extraction unit 120, a voice recognition unit 130, a language modeling unit 132, an acoustic modeling unit 134, a result analysis processing unit 140, and an output unit 150.

The reception unit 110 may receive a voice or voice signal from the user.

The characteristic extraction unit 120 may extract characteristics of the voice signal received from the user.

The voice recognition unit 130 may perform voice recognition using the language model unit 132 and the acoustic model unit 134.

The language model unit 132 may be configured to model an object to be used for voice recognition (hereinafter referred to as a voice recognition object). The language model unit 132 may be created by modeling at least one piece of context information to be used as a voice recognition object.

The acoustic model unit 134 may be configured to model a characteristic vector of each phoneme of a voice signal, and may determine which phonemes correspond to the received voice signal.

If the voice recognition result of the voice recognition unit is equal to or higher than a predetermined threshold value, the result analysis processing unit 140 may transmit the voice recognition result to the output unit 150.

Upon completion of voice recognition, the output unit 150 may control the result of searching for geographic information to be displayed on a display.

A voice recognition apparatus may generally construct contents recognized by the geographic information search result using the N-Best algorithm, and may provide the user with the constructed contents. In this case, a minimum of 5 candidate groups may be provided to the user or a maximum of more than 10 candidate groups may be provided to the user. A voice recognition apparatus may display the above candidate groups on one or more displays. In order to allow the user to confirm the corresponding list and select a user-desired POI during vehicle traveling, the user must avoidably monitor at the display for a predetermined time.

In addition, the user monitoring on the display may cause traffic accidents, such that some systems may sometimes read back the list using Test To Speech (TTS). However, it takes a long period of time to read all items on a list.

The disclosure of this section is to provide background of the invention. Applicant notes that this section may contain information available before this application. However, by providing this section, Applicant does not admit that any information contained in this section constitutes prior art.

SUMMARY

An aspect of the present invention is to provide a method and apparatus for searching for geographic information using interactive voice recognition.

Another aspect of the present invention is to provide an apparatus for reducing the number of search lists by generating interactive questions using voice recognition technology for a vehicle environment, thereby preventing distraction of a driver or user who rides in a vehicle.

Additional advantages, objects, and features of the invention will be set forth in part in the description which follows and in part will become apparent to those having ordinary skill in the art upon examination of the following or may be learned from practice of the invention. Advantages of the invention may be realized and attained by the structure particularly pointed out in the written description and claims hereof as well as the appended drawings.

To achieve advantages according to embodiments of the invention, as embodied and broadly described herein, an apparatus for searching for geographic information using interactive voice recognition includes: a receiver configured to receive a voice signal; a voice recognition unit configured to recognize the voice signal; a result analysis processing unit configured to search for geographic information on the basis of the recognized voice signal, and analyze a search result of the geographic information; and a question generating unit configured to generate a question in response to the result of determination.

In accordance with another aspect of the present invention, a method for searching for geographic information using interactive voice recognition includes: receiving a voice signal, and recognizing the voice signal; searching for geographic information on the basis of the recognized voice signal; analyzing a search result of the geographic information; and generating a question in response to the result of determination.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF EMBODIMENTS

Hereinafter, an apparatus and method according to embodiments of the present invention will be described with reference to the accompanying drawings. In the following description, suffixes "module" and "unit" contained in terms of constituent elements to be described will be selected or used together in consideration only of the convenience of writing the following specification, and the suffixes "module" and "unit" do not necessarily have different meanings or roles.

In the following description, assuming that a certain object is formed above (over) or below (beneath) the respective constituent elements, this means that two constituent elements are brought into direct contact with each other, or one or more constituent elements are disposed and formed between two constituent elements. In addition, assuming that a certain object is formed over or below the respective constituent elements, this means that the object may also be arranged in upward or downward directions on the basis of the position of one constituent element.

It will be understood that, although the terms first, second, A, B, (a), (b), etc. may be used herein to describe various elements of the present invention, these terms are only used to distinguish one element from another element and essential, order, or sequence of corresponding elements are not limited by these terms. It will be understood that when one element is referred to as being "connected to", "coupled to", or "accessed by" another element, one element may be "connected to", "coupled to", or "accessed by" another element via a further element although one element may be directly connected to or directly accessed by another element.

The term "comprises", "includes", or "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings of the related art from the context. Unless obviously defined in the present invention, such terms are not to be interpreted as having ideal or excessively formal meanings.

Embodiments of the present disclosure relate to a method and apparatus for searching for geographic information using interactive voice recognition, which receive a driver's voice signal through the apparatus for searching for geographic information using interactive voice recognition, search for geographic information on the basis of the voice signal, remove duplicate items from among the geographic information search results, select the largest number of items from among the geographic information search results, and thus generate a question (i.e., re-asking words).

According to an aspect of the invention, a system and method for searching a potential destination while a vehicle is driving using a voice input from a driver. A computing system (navigation system) installed on the vehicle recognizes the driver's voice input to search a destination. The computing system recognizes at least one keyword from the driver's voice input and search at least one destination that matches the at least one keyword.

In embodiments, on receiving a first voice input from the driver, the computing system performs a preliminary search to identify a plurality of potential destinations from a database (a local database of the vehicle, or a remote database connected to the system). In the database, a predetermined set of data fields are associated with each of the identified potential destinations. For example, for each destination, the database stores address, name, ZIP Code, telephone number according to a predetermined specification. In embodiments, the potential destinations identified are not notified to the driver (not displayed on a display of the vehicle) when the number of potential destinations are greater than a predetermined reference number.

Figure 5:
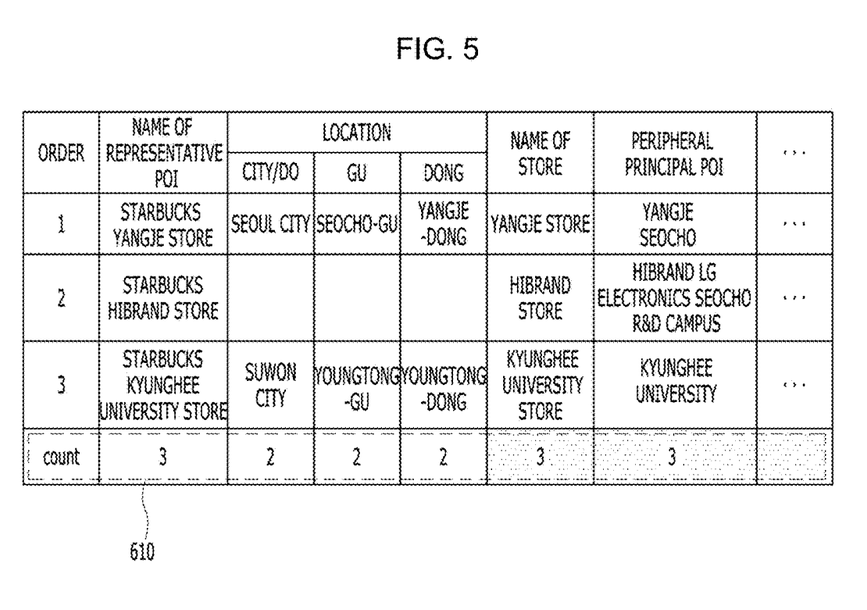
FIG. 5 illustrates a method for generating a question according to an embodiment of the present disclosure.

In embodiments, subsequent to the preliminary search, the system requests additional information for conducting an additional search to identify a subset of the potential destinations identified by the preliminary search. In embodiments, for each of data fields, the system computes counts (610) of different data in the particular field for the potential destinations identified. The system identifies a first data field that has the greatest number of different data for the potential destinations (the first data field is a data field that has the least number of different data for the potential destinations), and generate a request (voice) for the driver to specify further about the first data field. On receiving a second voice input from the driver in response to the request, the system identifies a first subset of the potential destinations and notify potential destinations of the subset using a display and/or a speaker of the vehicle.

In embodiments, when the number of destinations in the first subset is still greater than a predetermined reference number, the system repeats the analysis of data count for the subset, identify a second data field that has the least number of different data for the subset, and generates another request to the driver to specify further about the second data field to identify a second subset of destinations on the first subset. In embodiments, the system provides a list of destinations that match with the driver's voice input (search inquiry) only when the number of matching destinations is less than a predetermined reference number.

Figure 2:
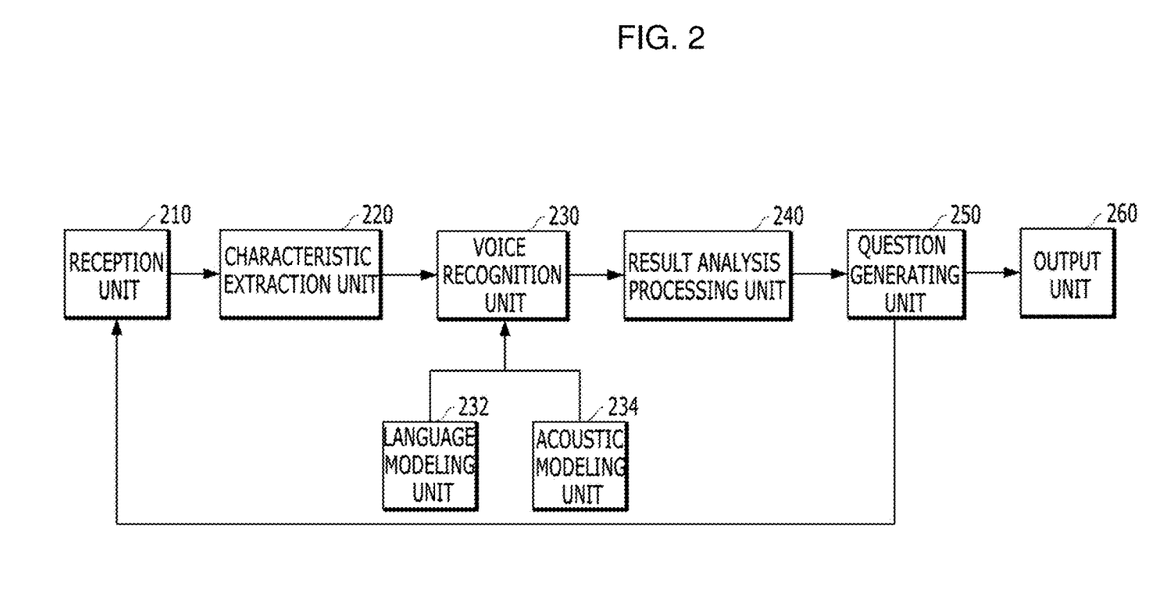
FIG. 2 is a block diagram illustrating an apparatus for searching for geographic information using interactive voice recognition according to an embodiment of the present disclosure.

FIG. 2 is a block diagram illustrating an apparatus for searching for geographic information using interactive voice recognition according to an embodiment of the present disclosure.

Referring to FIG. 2, the apparatus for searching for geographic information using interactive voice recognition may include a reception unit 210, a characteristic extraction unit 220, a language modeling unit 232, an acoustic modeling unit 234, a result analysis processing unit 240, a question generating unit 250, and an output unit 260.

The reception unit 210 may receive a voice from the user. Upon receiving the voice from the user, the reception unit 210 may output a voice signal corresponding to the received voice. In this case, the reception unit 210 may include a voice input unit including a microphone.

The characteristic extraction unit 220 may extract characteristics of the user's voice. The characteristic extraction unit 220 may convert the received voice into a voice signal capable of being processed, and may extract characteristic vectors from the user's voice signal. The characteristic extraction unit 220 may convert the received voice signal into voice data, and may detect endpoint information from the voice data and thus determine a voice section.

Upon receiving voice data to be searched from the characteristic extraction unit 220, the voice recognition unit 230 may perform voice recognition. The voice recognition unit 230 may perform voice recognition using the language modeling unit 232 and the sound modeling unit 234.

The language modeling unit may be configured to model a voice recognition object, and may be created by modeling at least one piece of context information to be used as the voice recognition object. Space to be recognized may be limited by a language model. Since the recognition space is limited, a search space is reduced in size so that a time needed for recognition and the number of calculations needed for such recognition can be reduced, resulting in increased accuracy of voice recognition.

Here, the context information may refer to a string of one or more words (hereinafter referred to as a word string) to be used as the voice recognition object. For example, the context information may be at least one of a word for various control commands, names needed to search for geographic information, and names needed to search for multimedia.

Here, the acoustic modeling unit 234 may be used to model a characteristic vector of each phoneme, and may be used to determine which phoneme corresponds to the received voice signal. In other words, the acoustic model unit 234 performs modeling of the characteristic vector corresponding to each phoneme.

For example, the acoustic model unit 234 may be comprised of a plurality of states representing voice sections having acoustically similar characteristics according to a Hidden Markov Model (HMM) method, and a transition probability between the pluralities of states. In addition, the acoustic model unit 234 may be constructed according to a temporal arrangement relationship such as Dynamic Time Warping (DTW), or may be implemented as an artificial neural network.

The result analysis processing unit 240 may search for geographic information from among geographic information search data through voice recognition information. The geographic information may include a position, a name of a store, and a POI (Point of Interest).

The result analysis processing unit 240 may output the geographic information search result. The output result may be output in the form of N-Best. The output result may include a maximum of more than 10 candidate groups.

The result analysis processing unit 240 may analyze the voice recognition result along with the tagged detailed information. The result analysis processing unit 240 may determine the number of recognized search results. If the number of recognized search results is less than a predetermined threshold value, the result analysis processing unit 240 may remove duplicate items from detailed items of the recognition result. The result analysis processing unit 240 may analyze the list of removed results, and may count the number of detailed items.

The question generating unit 250 may select an item having a high number of counted times in response to the count result as a question object. The question generating unit 250 may generate a question on the basis of the selected item.

The output unit 260 may include a display, a speaker, etc. The output unit 260 may display the geographic information search result based on voice recognition, that is received from the result analysis processing unit 240, on the display, or may audibly output the geographic information search result through a speaker embedded in the vehicle (hereinafter referred to as an in-vehicle speaker).

A method for searching for geographic information using the above-mentioned apparatus according to the embodiment of the present disclosure will hereinafter be described with reference to FIG. 3.

Figure 3:
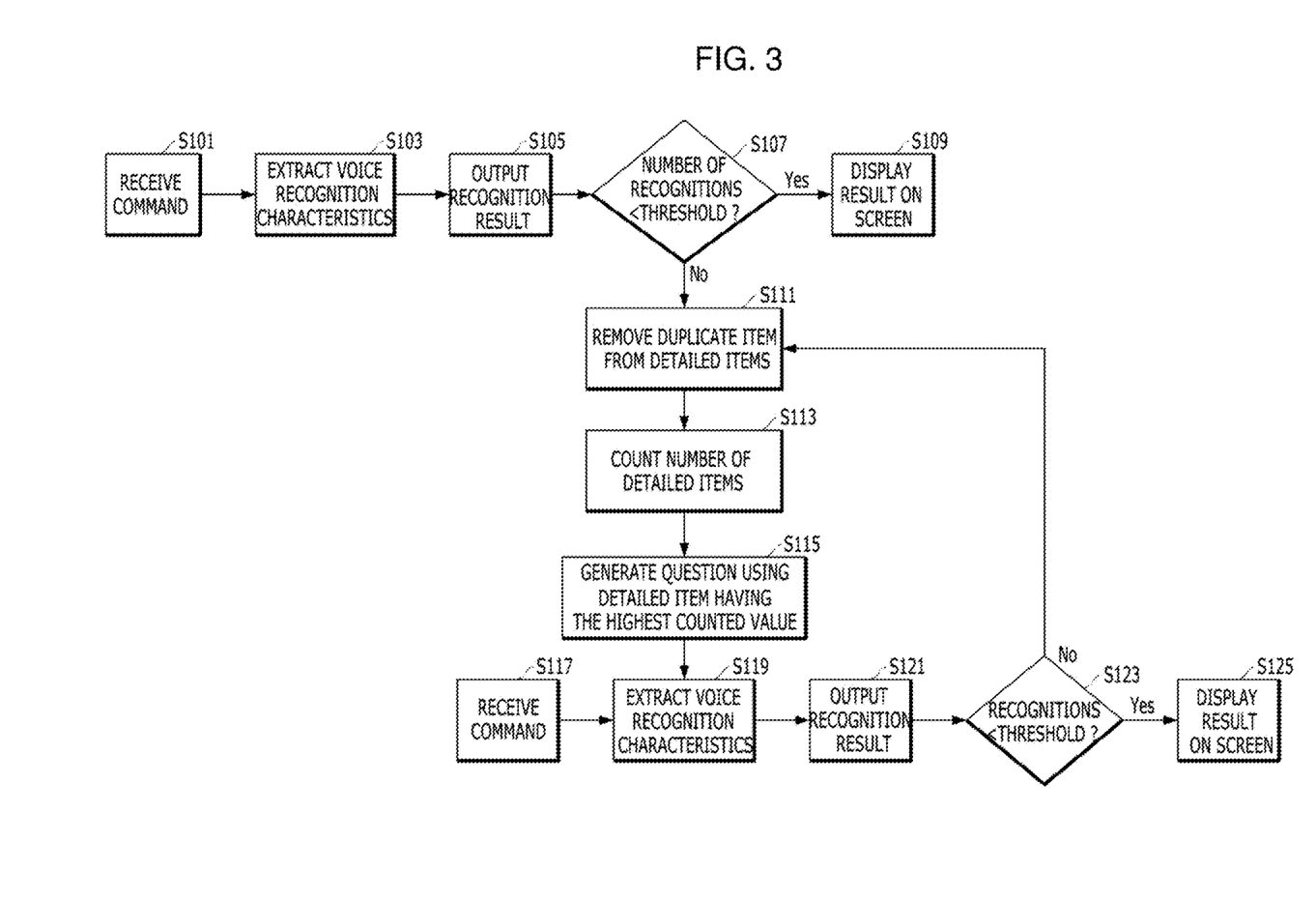
FIG. 3 is a flowchart illustrating a method of searching for geographic information using interactive voice recognition according to an embodiment of the present disclosure.

FIG. 3 is a flowchart illustrating a method for searching for geographic information using interactive voice recognition according to an embodiment of the present disclosure.

Referring to FIG. 3, the method for searching for geographic information using interactive voice recognition may receive a command from a user (S101).

The characteristic extraction unit 220 may extract characteristics corresponding to voice data from the user command (S103). The characteristic extraction unit 220 may detect endpoint information from the voice data so as to determine the presence or absence of a voice section, and may extract the characteristic vector from the voice section.

The result analysis processing unit 240 may search for at least one POI having the highest reliability through recognition engine search. The result analysis processing unit 240 may include geographic information search data needed to search for geographic information. The result analysis processing unit 240 may output the list of POI search results (S105).

The result analysis processing unit 240 may determine the number of output POI search result lists (S107).

If the number of recognized results is less than a threshold value, the result analysis processing unit 240 may transmit the output result to the output unit 260. The output unit 250 may display the resultant list on the display (S109).

For example, assuming that the threshold value is set to 3, this means that, if the number of recognitions is equal to or higher than 3, a current process proceeds to the next step S111. Of course, the threshold value is disclosed only for illustrative purposes, and the scope of this embodiment is not limited to the threshold value. In the following description, it is assumed that the number of recognitions is set to 3 for convenience of description.

If the number of recognitions is equal to or higher than a predetermined threshold value, the result analysis processing unit 240 may remove duplicate items from the detailed items of the resultant list (S111).

An example of the geographic information search result will hereinafter be described with reference to FIG. 4.

Figure 4A:
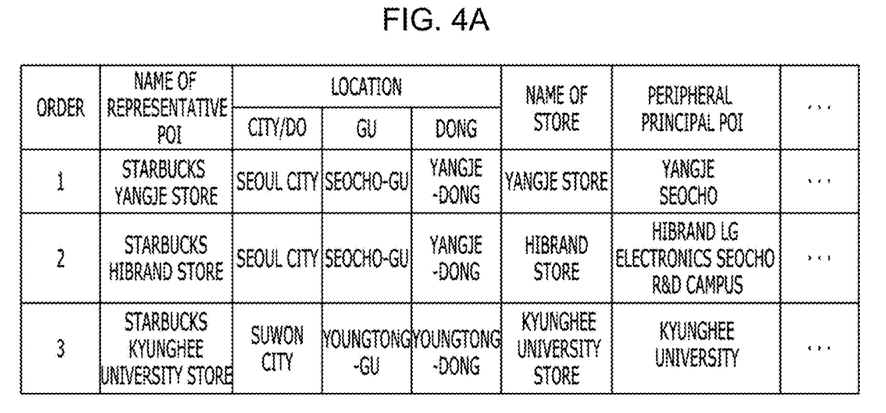
FIGS. 4A and 4B illustrate the geographic information search result according to an embodiment of the present disclosure.

Referring to FIG. 4(*a*), if the received command is Starbucks in step S101 (S101), the voice recognition result corresponding to the received command may include an order, the recognition result, location, the name of a store, a peripheral principal POI, etc. As described above, the number of recognition resultant items is set to 3.

For example, the recognition result of the first order (Order #1) may be "Starbucks Yangje Store". In response to the above recognition result, the location may include "Seoul", "Seocho-gu", and "Yangje-dong". In addition, the "name of store" corresponding to "Starbucks Yangje Store" may include "Yangje Store". The peripheral principal POI information of the Starbucks Yangje Store may include "Yangje station" and "Seocho-gu Office".

For example, the recognition result of the second order (Order #2) may be "Starbucks Hibrand Store". In response to the above recognition result, the location may include "Seoul", "Seocho-gu", and "Yangje-dong". The "name of store" corresponding to "Starbucks Hibrand Store" may include "Hibrand Store". The peripheral principal POI information of the Starbucks Hibrand Store may include "Hibrand LG electronics Seocho R&D Campus".

For example, the recognition result of the third order (Order #3) may be "Starbucks Kyunghee University Store". In response to the above recognition result, the location may include "Suwon City", "Youngtong-gu", "Youngdong-dong". The "name of store" corresponding to "Starbucks Kyunghee University Store" may include "Kyunghee University Store". The peripheral principal POI information of the Starbucks Kyunghee University Store may include "Kyunghee University".

Figure 4B:
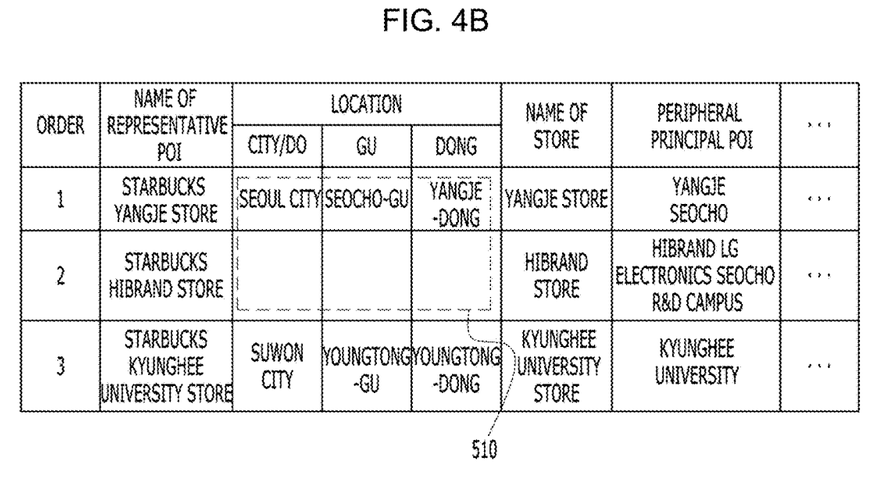

A table acquired when duplicate items are removed from the recognition results is illustrated in FIG. 4(b).

Referring to FIG. 4(b), "Starbucks Yangje Store" corresponding to the recognition result of Order #1 and "Starbucks Hibrand Store" corresponding to the recognition result of Order #2 may have the same location information.

If the location item of Order #1 is identical to that of Order #2, the location item 510 of "Starbucks Hibrand Store" of Order #2 may be removed.

Referring back to FIG. 3, according to the method for searching for geographic information using interactive voice recognition, the result analysis processing unit 240 may count the number of detailed items from which the duplicate items are removed (S113). An example of the count result is illustrated in FIG. 5.

Referring to FIG. 5, after the duplicate items are removed, the apparatus for searching for geographic information using interactive voice recognition may count the number of detailed items indicating the removal result of the duplicate items, and the count result is denoted by 610. As can be seen from the count result 610, each of "Name of Representative POI", "Name of Store", and "Peripheral Principal POI" may have a count value "3", each of "City/Do", "Gu", and "Dong" corresponding to detailed items of the location information may gave a count value "2". The question generating unit 250 may select a detailed item having the highest counted value on the basis of the counted items, and may generate a question on the basis of the selected item (S115).

For example, the items each having the highest counted value may be "Name of Representative POI", "Name of Store", and "Peripheral Principal POI". Therefore, the question generating unit 250 may select any one of the POI results as the question item. A reference needed for such selection may be decided according to a predetermined reference for each item.

The reason why the detailed item having the highest counted value is selected is that "low count value" indicates the presence or absence of at least one duplicate item in the corresponding detailed items. For example, assuming that "Dong" of FIG. 5 is selected as the question item, if the driver or user answers "Yangje-dong" to the selected question item "Dong", both Order #1 and Order #2 have the same information "Yangje-dong", such that Order #1 and Order #2 may be considered duplicate items. In contrast, assuming that "Name of Store" is selected as the question item, Order #1 to Order #3 may have different detailed items, such that only one of three items may be specified.

Therefore, the generated question may be audibly output through the output unit 260.

For example, assuming that "Name of Store" is selected, the question generating unit 250 may audibly output the question "What is the name of store?".

For example, assuming that "Peripheral Principal POI" is selected, the question generating unit 250 may audibly output the question "What is the name of peripheral building".

The reception unit 210 may receive a command corresponding to the question (S117).

For example, the reception unit 210 may receive "Yangje Store" or "Yangje Station" as a command corresponding to the question.

The characteristic extraction unit 220 may extract characteristics corresponding to the voice signal from the command corresponding to the question (S119).

The result analysis processing unit 240 may search for a POI candidate having the highest reliability through recognition engine search. The result analysis processing unit 240 may output the list of search results (S121).

The result analysis processing unit 240 may determine the number of output POI result lists (S213). In this case, if the number of recognitions is equal to or higher than a predetermined threshold value, the result analysis processing unit 240 may re-generate the question in response to the result of determination. Accordingly, the result analysis processing unit 240 may remove the duplicate items from the detailed items of the resultant list (S111).

In contrast, if the number of recognitions is less than the predetermined threshold value, the result analysis processing unit 240 may transmit the output result to the output unit 260. The output unit 260 may display the resultant list on the display (S125).

For example, assuming that the question item is "Name of Store" and the user answers "Yangje Store" to the question item, the corresponding item capable of satisfying the user's response "Yangje Store" is only Order #1. Therefore, when the predetermined threshold value is set to 3, the condition of step S123 is satisfied such that information corresponding to Order #1 may be displayed.

As is apparent from the above description, the effects of the method and apparatus for searching for geographic information using interactive voice recognition according to the embodiment of the present disclosure are as follows.

First, embodiments of the present disclosure reduce the number of output geographic information pieces using voice recognition to prevent user distraction, resulting in greater user or driver convenience of the user or driver.

Second, embodiments of the present disclosure reduce the number of geographic information search results using voice recognition, thereby providing an interactive voice recognition function.

The method according to embodiments of the invention may be manufactured as a program that can be executed by a computer and may be stored in recording media readable by the computer. Examples of the recording media readable by the computer may include a read only memory (ROM), a random access memory (RAM), a compact disc read only memory (CD-ROM), a magnetic tape, a floppy disk, and an optical data storage device. The recording media readable by the computer may be distributed to computer systems connected to each other through a network such that code readable by the computer is stored or executed in a distributed manner. In addition, a functional program, code, and code segments for embodying the above method may be easily reasoned by programmers in the art to which the disclosure pertains.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

What is claimed is:

1. A method for searching for geographic information using interactive voice recognition, comprising:
   receiving a first voice signal from a user;
   recognizing, by a voice recognition unit, the first voice signal;
   searching for geographic information on the basis of the recognized first voice signal;
   determining whether a first search result of the geographic information satisfies a first condition;
   when the first condition is not satisfied, generating a question in response to the result of the determination without displaying the first search result on a display;
   wherein the determining whether the first search result satisfies the first condition further includes:
      when the first search result does not satisfy the first condition, removing a duplicate item from at least one detailed item included in the first search result; and
      counting a number of detailed items included in the first search result from which the duplicate item is removed,
   recognizing, by the voice recognition unit, a second voice signal from the user in response to the question based on the count of the number of detailed items; and
   when the result of the voice recognition of the second voice signal in response to the question satisfies the first condition, displaying, on the display, a second search result satisfying the first condition.

2. The method according to claim 1, wherein the recognizing the first voice signal includes:
   converting the received first voice signal into voice data, determining a voice section by detecting endpoint information from the voice data, and extracting a characteristic vector from the voice section.

3. The method according to claim 1, wherein the searching for the geographic information includes:
   analyzing a result of the recognition of the first voice signal along with tagged detailed information.

4. The method according to claim 1, wherein the first condition indicates that the number of recognitions of the first search result is less than a predetermined threshold value.

5. The method according to claim 1, wherein the generating the question further includes:
   generating the question on the basis of a detailed item having a highest counted value from among the counted detailed items.

6. The method according to claim 1, further comprising:
   searching for geographic information on the basis of a result of the voice recognition corresponding to the question; and
   determining whether a geographic information search result satisfies the first condition.

7. The method according to claim 6, further comprising:
   if the geographic information search result does not satisfy the first condition, re-generating a question according to the result of determination.

8. A computer-readable recording medium having recorded thereon a program for performing the method for searching for geographic information using interactive voice recognition according to claim 1.

9. An apparatus for searching for geographic information using interactive voice recognition, comprising:
   a receiver configured to receive a first voice signal from a user;
   a voice recognition unit configured to recognize the first voice signal;
   a result analysis processing unit configured to search for geographic information on the basis of the recognized first voice signal, and determine whether a first search result of the geographic information satisfies a first condition; and
   a question generating unit configured to generate a question in response to the result of the determination when the first condition is not satisfied without displaying the first search result on a display,
   wherein the result analysis processing unit, when the first search result does not satisfy the first condition, removes a duplicate item from at least one detailed item included in the first search result,
   wherein the result analysis processing unit counts the number of detailed items included in the first search result from which the duplicate item is removed,
   wherein the voice recognition unit is further configured to recognize a second voice signal from the user in response to the question based on the count of the number of detailed items, and
   wherein the apparatus further comprises an output unit configured to display, on the display, a second search result satisfying the first condition when the result of the voice recognition of the second voice signal in response to the question satisfies the first condition.

10. The apparatus according to claim 9, further comprising:
    a characteristic extraction unit configured to convert the received first voice signal into voice data, determine a voice section by detecting endpoint information from the voice data, and extract a characteristic vector from the voice section.

11. The apparatus according to claim 9, wherein the result analysis processing unit analyzes a result of the recognition of the first voice signal along with tagged detailed information.

12. The apparatus according to claim 9, wherein the first condition indicates that the number of recognitions of the first search result is less than a predetermined threshold value.

13. The apparatus according to claim 9, wherein the question generating unit generates the question on the basis of a detailed item having a highest counted value from among the counted detailed items.

14. The apparatus according to claim 9, wherein the voice recognition unit performs voice recognition on the basis of a voice signal corresponding to the question.

15. The apparatus according to claim 14, wherein the result analysis processing unit searches for geographic information on the basis of a result of the voice recognition corresponding to the question, and determines whether a geographic information search result satisfies the first condition.

\* \* \* \* \*